United States Patent
Ho

(10) Patent No.: US 8,156,334 B2
(45) Date of Patent: Apr. 10, 2012

(54) PUBLIC KEY OUT-OF-BAND TRANSFER FOR MUTUAL AUTHENTICATION

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 379 days.

(21) Appl. No.: 12/539,733

(22) Filed: Aug. 12, 2009

(65) Prior Publication Data

US 2010/0042838 A1 Feb. 18, 2010

Related U.S. Application Data

(60) Provisional application No. 61/088,255, filed on Aug. 12, 2008, provisional application No. 61/148,637, filed on Jan. 30, 2009.

(51) Int. Cl.
*H04L 9/00* (2006.01)

(52) U.S. Cl. ............. 713/168; 713/169; 713/171

(58) Field of Classification Search ............ 713/150, 713/168–171, 181; 380/277–278, 44, 282–284; 726/2–4
See application file for complete search history.

(56) References Cited

U.S. PATENT DOCUMENTS

| 6,823,454 B1 * | 11/2004 | Hind et al. .............. 713/168 |
| 7,360,087 B2 * | 4/2008 | Jorgensen et al. ........ 713/168 |
| 7,386,720 B2 * | 6/2008 | Sandhu et al. ........... 713/155 |

\* cited by examiner

*Primary Examiner* — Hosuk Song
(74) *Attorney, Agent, or Firm* — Steven A. Shaw; W. James Brady; Frederick J. Telecky, Jr.

(57) ABSTRACT

Methods for key exchange and mutual authentication are provided that allow for inherent authentication and secret key derivation of parties communicating through an unsecured medium. These methods allow for greater security than existing key exchange and authentication methods while requiring little or no additional energy or time compared with a basic Diffie-Hellman key exchange. These methods allow for secure communication with small, low-power devices and greater security for any devices communicating through an unsecured medium.

24 Claims, 2 Drawing Sheets

PUBLIC KEY OUT-OF-BAND TRANSFER FOR MUTUAL AUTHENTICATION

CROSS-REFERENCE TO RELATED APPLICATIONS

This application is a non-provisional application claiming priority under 35 U.S.C. §119(e) to provisional application Ser. No. 61/088,255 filed on Aug. 12, 2008, entitled "Public Key Out-of-Band Public Key Transfer for Mutual Authentication," the teachings of which are incorporated by reference herein.

This application is a non-provisional application claiming priority under 35 U.S.C. §119(e) to provisional application Ser. No. 61/148,637 filed on Jan. 30, 2009, entitled "Reduced Computation for Bit-by-Bit Password Verification in Mutual Authentication," the teachings of which are incorporated by reference herein.

BACKGROUND

1. Field

The invention generally relates to data communications and security. More particularly, embodiments of the invention relate to mutual authentication of two communicating parties through verification of the public key of one of the parties without revealing that public key.

2. Background Information

Communication between two parties over an open channel poses several security problems for the communicating parties. Their communications can be overheard or forged by a third party, which poses a problem for them if they wished their exchanges to be confidential and authentic.

The risk of a third party intercepting, interpreting, and interjecting messages over an open channel is typically addressed by encryption and authentication performed with a secret key shared only between the two legitimate parties. Such a secret key in turn is often established based on public key cryptography methods. These methods allow two parties to exchange a public piece of information and use their counterparty's public information, along with a piece of their own private information, to derive the shared secret key that no one with knowledge only of the parties' public keys could trivially determine.

These exchanges of public information to generate secrets shared only between the two communicating parties, called Diffie-Hellman exchanges, are now used widely for pairing or associating two communicating parties with each other over an open channel. Two popular algorithms to use to this end are exponential discrete logarithm cryptography and elliptic curve cryptography.

Diffie-Hellman exchanges, however, do not solve the problem of impersonation, where a party to communication is pretending to be another party in order to obtain information or privilege. This sort of attack is particularly effective when the same party impersonates each party to a communication to the other party, gaining access to the information exchanged between them. These so-called "man in the middle," or MITM attacks, present an ongoing problem of authentication. Specifically, how can a party communicating over an open channel authenticate the identity of the counterparty?

One popular solution to this problem uses a password or other predetermined shibboleth. The two parties authenticate each other by each confirming that the other party has knowledge of the same password. This poses its own issues. Each party risks exposing the password to a third party, often due to intended or unintended human behavior. In particular, the central controller of a network could be compromised, exposing its list file containing the passwords for the devices it controls to wrong hands. Once an adversary obtains a password intended to be shared only between two legitimate parties, the adversary can impersonate one of these parties to communicate with the other party breaking the security check.

Therefore, what is needed is a method and system that allow two legitimate parties to authenticate each other while preventing false impersonation even if an attacker has managed to gather the authentication credentials.

SUMMARY

The disclosure presents mechanisms for integrating the authentication process into the Diffie-Hellman key exchange. According to one embodiment of the invention, one or both of the parties' "public" keys are not transferred over the open communication channel. Instead, two parties reference their public keys and each party retrieves the relevant key through an out-of-band channel. Such an out-of-band channel may be a device drive such as a USB memory stick storing the desired public key, a networked connection that can be used to obtain the desired public key from a trusted database, and the like. According to another embodiment of the invention, a communicating party's public key, along with its unique identifier, is transferred to the communicating party over the open channel and an out-of-band channel. The latter checks the public key received over the open channel against that received over the out-of-band channel, continuing with the key exchange and authentication process only if the two copies match. An impostor would not be able to participate in the Diffie-Hellman exchange without access to both the public key and private key of the impersonated party, and thus would not be able to mount a detrimental security attack to obtain or manipulate information.

DETAILED DESCRIPTION OF THE PREFERRED EMBODIMENTS

Overview

Figure 1:
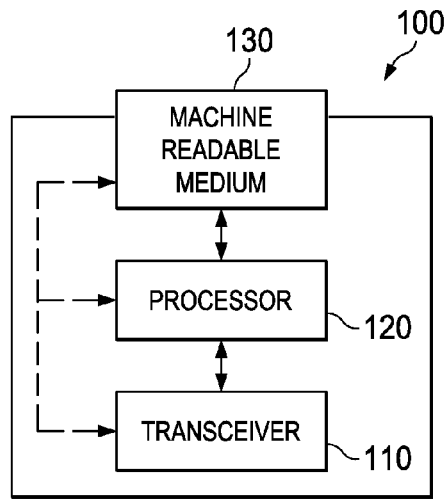
FIG. 1 illustrates a network device.

This disclosure deals principally with secured communications between two network devices over an open, or unsecured, channel. In such a channel, authenticating the identity of a counterparty and establishing a secret key shared only between the two authenticated parties is the first step toward achieving confidentiality and authenticity of the communications.

An effective method allowing two parties to establish a shared secret in broad light, i.e., over an open channel, is the so-called Diffie-Hellman key exchange. For this exchange, each of the two parties has a private key and a public key. The public key is generated from the private key but it is computationally infeasible to determine the private key from the public key by the mathematical nature of the underlying algorithm. The two parties transmit their respective keys to each other over the open channel, without disclosing their private keys. Hence the public keys become public information, and the private keys remain as private information. Each then uses the received public key from the other party and its own private key to compute a common secret. Such a shared secret is not accessible to an eavesdropping third party, which does not have either private key in order to derive the secret. The two parties then use the shared secret to generate a key that can be used to authenticate and encrypt their exchanged messages, leaving anyone without that key unable to modify or decrypt their messages.

There are two popular algorithms used in Diffie-Hellman key exchanges: exponential discrete logarithm cryptography and elliptic curve cryptography. This disclosure is not limited to those cryptography algorithms and any algorithm where private and public keys are used to generate one or more shared secrets would work.

Diffie-Hellman key exchanges offer no protection against man-in-the-middle attacks or impersonation attacks, because an impersonator can complete a Diffie-Hellman exchange with any legitimate party. Typically, these attacks are countered through separate authentication procedures. Common authentication procedures include password verification and authentication display. In password verification, two parties must know the same secret password to authenticate each other. In authentication display, two devices will each display a number computed from the generated shared secret, and that number will match when the two devices have completed a key exchange with each other but not with a third party—an imposter. Password based authentication procedures are often defeated by password guessing or stealing. Display-based authentication procedures require a visible user-device interface, which is too impractical or expensive for many devices.

This disclosure describes key exchange procedures with inherent mutual authentication, offering superior security and lower operational power requirements relative to existing authentication and key exchange procedures.

Network Devices

The methods embodiments of this disclosure are performed by network devices. While the implementation of these network devices varies widely from one manufacturer or purpose to another, these devices share several basic characteristics.

FIG. 1 illustrates such a device. The device 100 is comprised of three essential components: a transceiver 110, a processor 120, and a machine-readable medium 130.

The transceiver 110 sends signals to and receives signals from other devices. These transceivers are well understood in the art. For wired devices, these transceivers entail devices capable of sending and receiving signals over twisted pair copper wires, coaxial cable, or optical fiber. For wireless devices, these transceivers entail sending and receiving electromagnetic waves carrying desired signals without a wired medium. Wireless devices generally operate between 3 kHz and 300 GHz. Wireless devices could also use higher frequency electromagnetic radiation, such as infra-red or visible light, under appropriate conditions. Other signal types, such as sound waves, are also possible. A network device may have more than one transceiver. For example, wireless LAN routers typically have both a wireless transceiver and a wired transceiver.

The processor 120 interprets the signals received from the transceiver, parsing them into a useful form. The processor 120 also formats signals to send to the transceiver 110 for transmission. The processor 120 further manipulates data to support a protocol run. The processor 120 typically has a local machine readable medium, such as random access memory (RAM), which allows the temporary storage of signal data for later conversion and transmission. The processor 120 may be an instruction based processing unit embedded into the device or a hardwired state machine designed to handle the specific tasks of a protocol.

The transceiver 110, processor 120, and machine readable medium 130 may be directly connected with one another or the machine readable medium 130 may be connected to the processor which may then be connected to the transceiver 110.

Network devices may also have other components not shown here as to not complicate the figures. For example many network devices, such as personal computers and telephones, have input and output components distinct from the physical network device in the form of speakers, microphones, screens, keypads, keyboards, etc. Network devices used as sensors may have other input components including, but not limited to, temperature, chemical, optical, electrical, and mechanical sensing units.

Diffie-Hellman Key Exchange and Authentication

Figure 2:
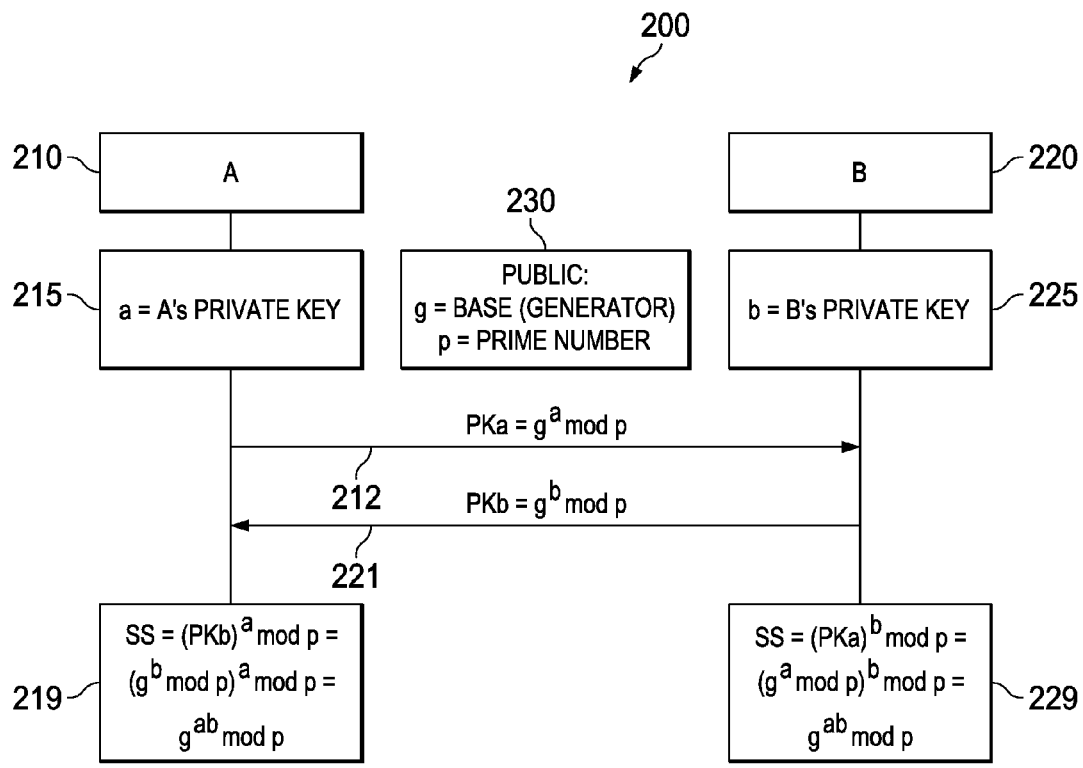
FIG. 2 illustrates a Diffie-Hellman exchange between two network devices using exponential discrete logarithm cryptography for secret key derivation.

FIG. 2 shows a typical Diffie-Hellman exchange 200 using exponential discrete logarithm cryptography. The first device reveals, or the devices have already adopted, a base of exponentiation (g) and a prime number (p) 230. The first device A 210 uses g and p with its private key (a) 215 to generate its public key PKa and reveals PKa 212 to the second device B 220. The second device B 220 uses the same base and prime as the first device and its private key (b) 225 to generate is public key PKb, which it then reveals PKb 221 to the first device A 210. At this point, the two devices 210 and 220 may use their private key and the other device's public key to derive the same shared secret (SS) 219 and 229 which can be used to further generate a key for encrypting and authenticating subsequent messages exchanged between the two devices 210 and 220. A similar exchange is used based on elliptical curve cryptography.

Authentication to protect against active attacks, such as impersonation and man-in-the-middle attacks, typically follows a Diffie-Hellman key exchange. One drawback of this approach is that the channel may be no more secure than the authentication protocol. For example, passwords are typically far easier to guess than the private keys used in Diffie-Hellman exchanges. Additionally, separate password verification procedures may reveal information about the password even when an attacker fails to guess correctly. As a result, mutual authentication procedures using separate password verification can be compromised more easily than the Diffie-Hellman key exchange to be authenticated. Separate authentication procedures may also require additional operational power, channel bandwidth, and connection latency. This may place higher overhead and power requirements on network devices while degrading performance.

Public Key Out-of-Band Transfer for Mutual Authentication and Secret Key Derivation This disclosure details methods for combining Diffie-Hellman key exchange with the authentication process, allowing a significant improvement in security and a significant reduction in computation and power requirements for authentication.

Figure 3:
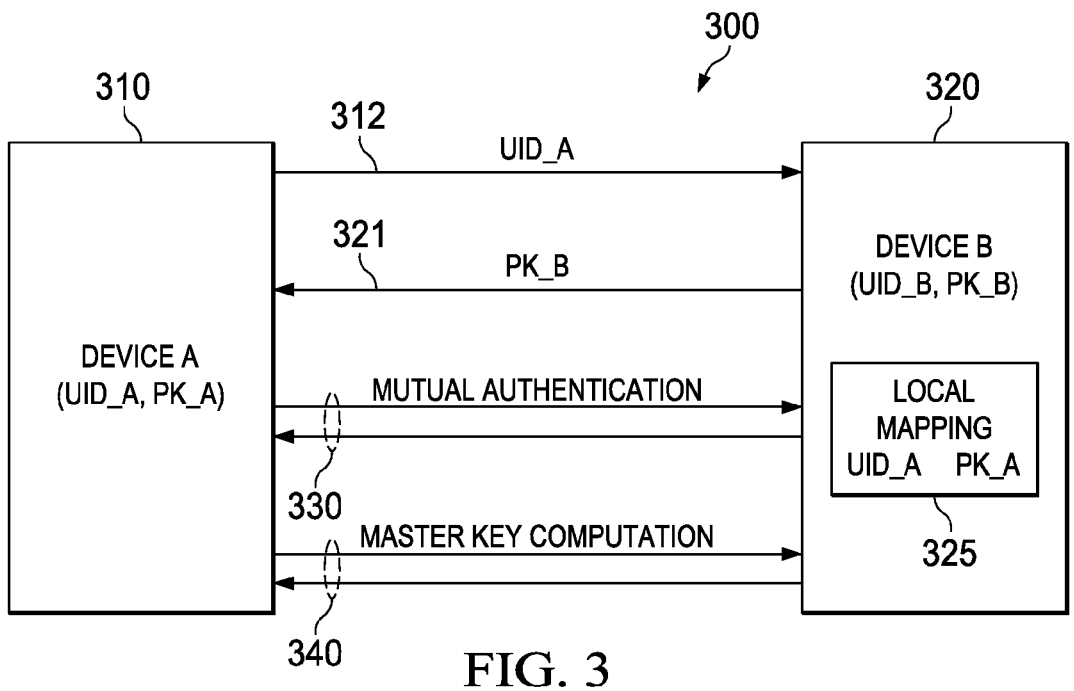
FIG. 3 illustrates two network devices engaging in unilateral public key out of band transfer for mutual authentication and secret key derivation.

FIG. 3 is illustrative of a method for unilateral public key out-of-band transfer for mutual authentication and secret key derivation. In this embodiment 300, a first network device A 310 reveals its unique identification 312 to a second network device B 320. The second network device 320 uses the first device's unique identification to find the first device's public key from a local mapping 325, which may be truthfully obtained from a storage medium internally or externally connected to the second device 320. The second device 320 reveals its public key 321 to the first device 310. At this point, the two devices each have the public key for the other device, and can generate a shared secret to authenticate each other 330 and to further generate a master key 340 for subsequent encryption and authentication of the exchanged messages.

To authenticate each other 330, the two devices compute two verification values, preferably using standardized one-way cryptographic hash functions, based on the shared secret and some other information known to both of them. One device then sends one of the verification values to the other. The latter checks the received verification value against its own computed value. If the two values do not match, the authentication fails. If the two values match, the latter device sends the other verification value to the former device, which performs a similar check. If the check fails, so does the authentication; otherwise the two devices have successfully authenticated each other.

Upon successful mutual authentication 330, each of the two devices 310, 320 computes a shared secret master key, again preferably using a standardized one-way cryptographic hash function, based on the shared secret and some other relevant information. The master key is then used directly or indirectly to secure data communications between the two devices. When used to secure data communication directly, the master key is used as the key to secure, i.e., to encrypt and authenticate, the data communications. When used to secure data communication indirectly, the master key is used through a one-way cryptography hash function to create another shared secret key, often referred to as the session key in the security community, which is then used to encrypt and authenticate the data communications.

In the unilateral method of FIG. 3, a successful mutual authentication 330 indicates that device A 310 possesses the private key corresponding with the public key associated with device A's identification in device B's local mapping 325, authenticating device A to device B. Device B's retrieval of device A's public key authenticates device B to device A, provided device B 320 is the only device that knows the public key of device A as suggested by the out-of-band transfer of device A's public key to device B 320.

Figure 4:
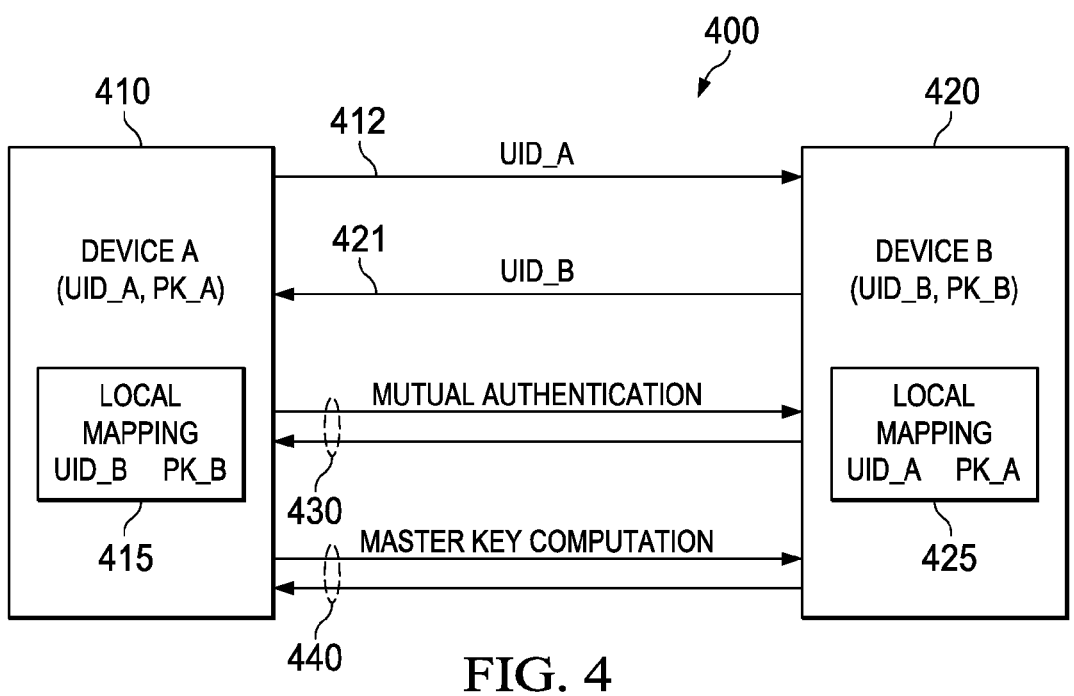
FIG. 4 illustrates two network devices engaging in bilateral public key out of band transfer for mutual authentication and secret key derivation.

FIG. 4 illustrates a method for bilateral public key out-of-band transfer for mutual authentication and secret key derivation. In this embodiment 400, the two network devices A 410 and B 420 exchange unique identifiers UID_A 412, UID_B 421 and each device uses the other device's unique identifier to find the other device's public key in local mapping 415, 425. At this point, the two devices (A 410 and B 420) each have the public key for the other device and can generate a desired shared secret as in FIG. 3. Mutual authentication 430 and master key computation 440 proceed as in FIG. 3.

Both of these embodiments rely on local mapping to retrieve a partner's public key using that partner's unique identifier. This information may be provided in several ways.

The unique identifiers and corresponding public keys may be provided at the time the device is manufactured. This would require a large number of unique identifiers and keys to be generated early in the manufacturing process to accommodate the volume of future products.

The unique identifiers and corresponding public keys may be provided such that a public key can be determined from the unique identifier, allowing for comprehensive coverage with less storage capacity.

The unique identifiers and corresponding public keys may be transferred between the devices through an out-of-band transfer prior to use. For example, a detachable storage device could be used to exchange unique identifiers and public keys. This approach requires far less local storage than those requiring exhaustive lists, but it requires intervention on the part of the device users.

The unique identifiers and corresponding public keys can also be retrieved from a trusted remote database. This remote database contains the unique identifiers and public keys for registered network devices, so it can take a network device's unique identifier and look up the corresponding public key. Then, the database may send the public key back to the network device requesting this information, along with other necessary information to ensure that the transmitted unique identifier and public key are indeed original, such as by means of a public key certificate.

Potentially, both devices could use the remote database, and the remote database could be programmed to only release information to requesting devices when each device queries the database asking for the other device's unique identifier and public key within a specific time frame.

Alternatively, one or both of the communicating parties may reveal both their unique identifier and their public key through the unsecured channel and the counterparty network device could verify the revealing device's identity by confirming that the unique identifier matched the public key.

The secrecy of unique identifier/public key associations is not required, but may be preferred if any devices share public keys. Even if both a device's unique identifier and its public key are known to an attacker, that attacker cannot impersonate that device without knowing that device's private key. This makes compromising a device through an active attack as difficult as compromising the device through a passive attack, forcing the attacker to defeat the mathematically hard underlying algorithm employed in the Diffie-Hellman exchange in order to gain access. This level of protection far exceeds existing authentication protocols with minimal operational or computational cost.

While methods have been described here with reference to specific devices and using specific implementation details, those skilled in the art will appreciate that certain substitutions, alterations, or omissions may be made to the embodiments without departing from the spirit of the disclosure. Accordingly, the foregoing description is meant to be exemplary only and should not limit the scope of the invention as set forth in the claims.

What is claimed is:

1. A network device comprising
a transceiver;
a processor;
a machine readable medium; and
a private key,
wherein said network device performs a key exchange and authentication method with a second network device, said method comprising:
revealing a unique identifier to said second network device;

receiving a revelation of a key associated with said second network device from said second network device which used said unique identifier of said network device to obtain a key associated with said network device; and said network device using its private key, said key associated with said second network device, and known parameters to generate a shared secret, said method further comprising:

each network device using said shared secret and other information known to both devices to compute two distinct verification numbers;

each network device sharing one of said verification numbers while keeping the other secret; and each network device accepting the identity of the other network device if the verification number kept secret by the network device is identical to the verification number received from the other network device.

2. The network device of claim 1, wherein said second network device obtains said key associated with said network device by accessing a local machine readable medium.

3. The network device of claim 1, wherein said second network device obtains said key associated with said network device by connecting to a remote database.

4. The network device of claim 1, wherein said key associated with said network device is transferred to said second network device via a removable machine readable medium.

5. The network device of claim 1, wherein said second network device obtains said key associated with said network device by directly accessing a machine readable medium of said network device.

6. The network device of claim 1, wherein said distinct verification numbers are computed using a standardized one-way cryptographic hash function.

7. A network device comprising
a transceiver;
a processor;
a machine readable medium; and
a private key,
wherein said network device performs a key exchange and authentication method with a second network device, said method comprising:
revealing a unique identifier to said second network device;
receiving a revelation of a key associated with said second network device from said second network device which used said unique identifier of said network device to obtain a key associated with said network device; and
said network device using its private key, said key associated with said second network device, and known parameters to generate a shared secret,
said method additionally comprising:
each network device using said shared secret and other information known to both devices to compute a shared secret master key; and
each network device using said shared secret master key to secure subsequent communication with the other device.

8. The network device of claim 7, wherein said shared secret master key is computed using a standardized one-way cryptographic hash function.

9. A system comprising:
a first network device comprising:
a transceiver;
a processor;
a machine readable medium; and
a private key,
a second network device comprising:
a transceiver;
a processor;
a machine readable medium; and
a private key,
wherein said first network device performs a key exchange and authentication method with said second network device, said method comprising:
first network device revealing a unique identifier of said first network device to said second network device;
second network device revealing a unique identifier a unique identifier of said second network device to said first network device;
first network device using said second network device's said unique identifier to obtain a key associated with said second network device;
second network device using said second network device's said unique identifier to obtain a key associated with said first network device; and
each said network device using its private key, said key associated with said other network device, and known parameters to generate a shared secret,
said method further comprising:
each said network device using said shared secret and other information known to both of said network devices to compute two distinct verification numbers;
each said network device sharing one of said verification numbers while keeping the other secret; and
each said network device accepting the identity of said other network device if the verification number kept secret by said network device is identical to the verification number received from said other network device.

10. The system of claim 9, wherein one of said network devices obtains said key associated with said other network device by accessing a machine readable medium.

11. The system of claim 9, wherein one of said network devices obtains said key associated with said other network device by connecting to a remote database.

12. The system of claim 9, wherein said key associated with one of said network devices is transferred to said other network device via a removable machine readable medium.

13. The system of claim 9, wherein one of said network devices obtains said key associated with said other network device by directly accessing a machine readable medium of said other network device.

14. The system of claim 9, wherein said distinct verification numbers are computed using a standardized one-way cryptographic hash function.

15. A system comprising:
a first network device comprising:
a transceiver;
a processor;
a machine readable medium; and
a private key,
a second network device comprising:
a transceiver;
a processor;
a machine readable medium; and
a private key,
wherein said first network device performs a key exchange and authentication method with said second network device, said method comprising:
first network device revealing a unique identifier of said first network device to said second network device;

second network device revealing a unique identifier a unique identifier of said second network device to said first network device;

first network device using said second network device's said unique identifier to obtain a key associated with said second network device;

second network device using said second network device's said unique identifier to obtain a key associated with said first network device; and each said network device using its private key, said key associated with said other network device, and known parameters to generate a shared secret;

said method additionally comprising:

each said network device using said shared secret and other information known to both said network devices to compute a shared secret master key; and each said network device using said shared secret master key to secure subsequent communication with said other network device.

16. The system of claim 15, wherein said shared secret master key is computed using a standardized one-way cryptographic hash function.

17. A method for key exchange and authentication between a first network device and a second network device, each said network device having a private key, said method comprising:

first network device revealing a unique identifier to said second network device;

first network device obtaining a key associated with said second network device, said key created using said unique identifier of said first network device; and first network device using its private key, said key associated with said second network device, and known parameters to generate a shared secret, said method further comprising:

each said network device using said shared secret and other information known to both said network devices to compute two distinct verification numbers;

each said network device sharing one of said verification numbers while keeping the other secret; and each said network device accepting the identity of said other network device if the verification number kept secret by said network device is identical to the verification number received from said other network device.

18. The method of claim 17, wherein said first network device obtains said key associated with said second network device by accessing a machine readable medium.

19. The method of claim 17, wherein said first network device obtains said key associated with said second network device by connecting to a remote database.

20. The method of claim 17, wherein said key associated with said second network device is transferred to said second network device via a removable machine readable medium.

21. The method of claim 17, wherein one of said first network device obtains said key associated with said second network device by directly accessing a machine readable medium of said second network device.

22. The method of claim 17, wherein said distinct verification numbers are computed using a standardized one-way cryptographic hash function.

23. A method for key exchange and authentication between a first network device and a second network device, each said network device having a private key, said method comprising:

first network device revealing a unique identifier to said second network device;

first network device obtaining a key associated with said second network device, said key created using said unique identifier of said first network device; and first network device using its private key, said key associated with said second network device, and known parameters to generate a shared secret, said method additionally comprising:

each said network device using said shared secret and other information known to both devices to compute a shared secret master key; and each said network device using said shared secret master key to secure subsequent communication with the other device.

24. The method of claim 23, wherein said shared secret master key is computed using a standardized one-way cryptographic hash function.

* * * * *